United States Patent [19]  [11] 4,131,310
Martinsen  [45] Dec. 26, 1978

[54] COMPACT CAMPING RIG

[76] Inventor: Keith W. Martinsen, 6745 Riverside Dr. E., Windsor, Ontario, Canada, N8S 1C1

[21] Appl. No.: 816,725

[22] Filed: Jul. 18, 1977

[51] Int. Cl.² .............................................. B60P 3/34
[52] U.S. Cl. ................................ 296/23 R; 135/1 A; 135/4 A
[58] Field of Search ............... 296/23 R, 23 F, 23 G, 296/23 MC, 26; 135/1 A, 4 A, 5 A

[56] References Cited

U.S. PATENT DOCUMENTS

| | | | |
|---|---|---|---|
| 3,599,651 | 8/1971 | Perry | 135/1 A |
| 3,707,977 | 1/1973 | Grady | 135/1 A |
| 3,743,345 | 7/1973 | Eckman | 296/23 R |
| 3,968,809 | 7/1976 | Bravers | 296/23 MC |
| 4,010,973 | 3/1977 | Heinrich | 296/23 R |

Primary Examiner—Joseph F. Peters, Jr.
Assistant Examiner—Gene A. Church
Attorney, Agent, or Firm—Charles Krassov

[57] ABSTRACT

This invention is a camping rig attachable to the rear of a van. It consists of a central open bottom rectangular box with a hinged open end wing at each side thereof; each wing containing half of a canvas tent. A door enclosed cupboard is located at one side of the central box. The open part of the central box has a removable cover provided with fold-away legs which transform the cover into a table. The folded rig is suspended from a pair of extendable arms attached to the top and rear of the van. To set up the camping tent, the arms are extended; the folded rig is moved to the free ends of the arms, rotated to and fixed in a horizontal position, and unfolded; the tent is removed from the wings, wrapped around and attached to the perimeter of the unfolded box and to the top and upper corners of the rear of the van. For packing away the rig, the above procedure is reversed. A pair of supporting legs are provided to the free end of the unfolded box.

2 Claims, 10 Drawing Figures

FIG. 6

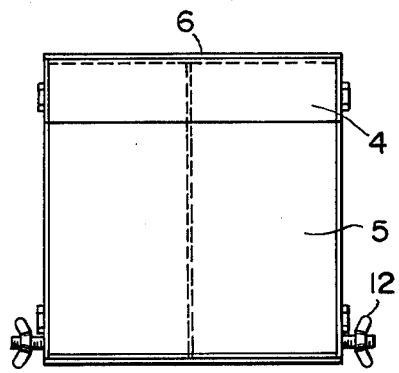
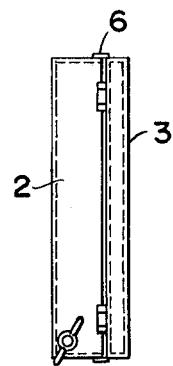
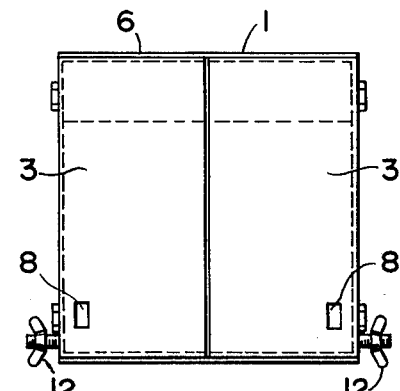
FIG. 3    FIG. 2    FIG. 1
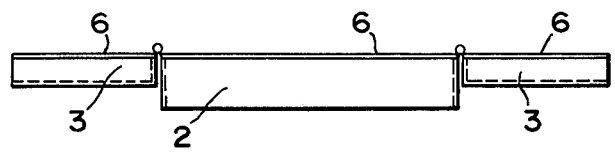
FIG. 4
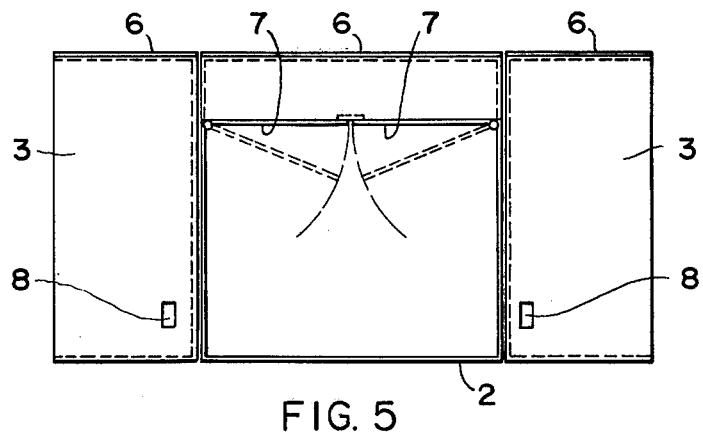
FIG. 5
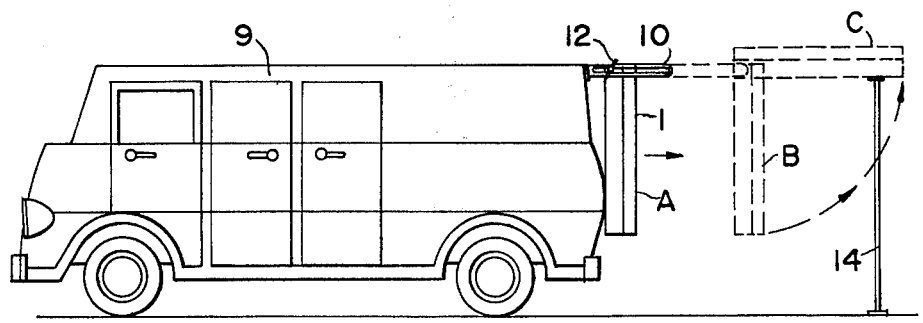
FIG. 6

COMPACT CAMPING RIG

This invention relates generally to camping equipment, and particularly to compactly folded camping equipment which is transported by means of a car or truck to which it is attached.

Camping equipment which is used occasionally, consists primarily of a tent which when properly erected provides shelter and facilities for human requirements, such as eating, sleeping, etc. In desiging such equipment, some of the important factors to be considered are compactness for easy transportation, simplified foldaway and erection, reduced weight so that it can be carried by comparatively small vehicles, and production at a low cost so that it may be available to a larger number of the population.

From the following description it will become evident that this invention meets all of the above mentioned essential requirements.

In describing the invention reference will be made to the attached drawings in which, FIG. 1, shows a front elevation of the invention, in the folded form, FIG. 2, shows a side elevation of the invention, in the folded form, FIG. 3, shows a rear view of the invention in the folded form, FIG. 4, shows a plan view of the invention in the unfolded form, FIG. 5, shows an elevation of the invention in the unfolded form, FIG. 6, is an elevation showing the manner of the attachment of the invention to a standard small van, FIG. 7, shows a suggested extendable carrying arm, FIG. 8, shows the erected tent ready for occupancy.

Figure 8:
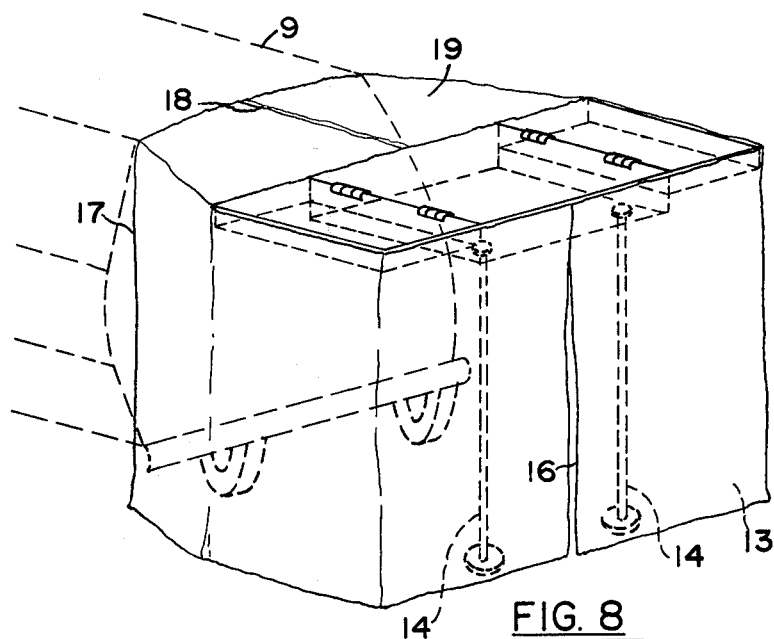
Figure 10:
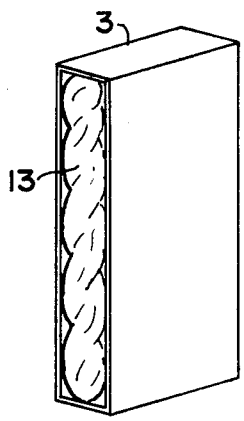
FIG. 10, shows the method of storage of the tent.

In the drawings the invention is shown consisting of a central, open bottom rectangular box 2, to each of two opposite sides of which is hingedly attached an open end, rectangular wing 3. The wings are of the same length as the box 2, and half the thickness and width of said box, so that they can fold over and cover the top of the central box 2. The unfolded box 2 with its wings 3,3, constitute the greater part of the roof for the erected tent, as can be seen in FIG. 8.

Figure 9:
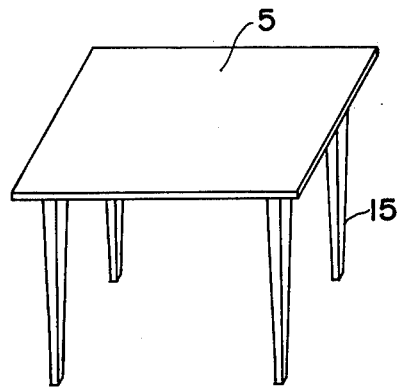
FIG. 9, shows a table which is part of the invention.

The open bottom of the central box 2 is partly enclosed at one end thereof to form a cupboard 4, within said box. This cupboard is equipped with two ginged doors 7,7. The remainder of the open bottom of box 2 is covered by a plate 5 which, when provided with foldaway legs 15, can be converted into a useful table as shown in FIG. 9.

The upper edges of the central box 2 and its wings 3,3, are provided with tracks 6 around the perimeter formed in the unfolded position, by means of which the upper part of the tent 13 can be attached thereto. These tracks can consist of grooved tracks where thickened edges of the tent can be inserted, they can be replaced by various types of zippers, or they may consist of both tracks and zippers, as various conditions may require.

The wings 3,3, are also provided with openings 8, the purpose of which is to insert tail lights which would replace the tail lights of the van when the camping rig is attached to and being carried by the van.

Figure 7:
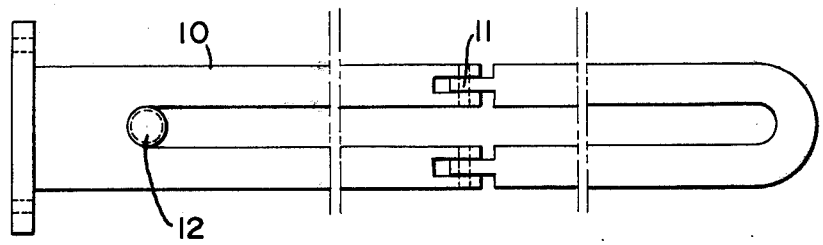

A pair of grooved arms are attached to the rear of the van 9 for supporting and carrying the rig 1. These arms are made extendable so that in the carrying position they do not protrude too far from the van, while during the erection of the tent they can be made much longer in order to make the tent capacity as large as possible. In FIG. 7 is shown a suggested construction of the arms 10 in which case said arms are hinged at their centers, as shown by 11 in FIG. 7, so that in their folded position they are only half as long as when they are extended.

The rig 1 slides in a channel in the arms 10 by means of a pair of wing nut equipped bolts 12,12, which are attached one on each side of the box 2, so that the rig 1 can slide freely or be held rigidly in any position or location by loosening or tightening the said wing nuts.

To erect the camping equipment, the arms 10,10, are extended and the rig 1 is moved from the "A" position to the "B" position, and then rotated to the horizontal "C" position (refer to FIG. 6). In this position, the wing nuts are tightened against the arms and the free end of rig 1 is supported on the ground by a pair of legs 14,14.

The tent 13 is made into a right hand and left hand sections, out of the usual tent materials. These sections are attached to the rim of the unfolded boxes 2 and 3, as described above, so that the edges of these sections abut each other to form a tent entrance 16, wrap around the sides, and extend beyond the wings 3,3, to be attached to the upper corners in the rear of the van, to form the sides of the tent. To provide a roof covering for the space between the unfolded boxes and the rear of the van, the side extensions 17 of the tent, are extended in length upwardly, folded over, and zipped together at 18 to form the required roof 19.

Although this invention was intended to be used preferably with a small totally enclosed van commonly used as a combined small business delivery truck and for domestic use, there is no limit to its size for use with much larger vehicles, by a simple change in the dimensions of its components, without actually departing from the scope of the invention.

Having described the invention, what I claim is:

1. A folded self-contained camping rig which is attachable to the rear of a van or similar vehicle, in order to avoid wind drag, obstruction to sun roofs and air vents, and occupation of valuable room within said van, comprising in combination a rectangular central box with a partly enclosed bottom, having hingedly attached to each of two opposite sides thereof, a rectangular box-shaped wing, each of said wings having an open side opposite to the said hinged side, said wings being of the same length but half the width of the central box; the partly enclosed part of said central box being provided with a pair of doors to form an enclosed cupboard within the central box; a removable rectangular cover for the remaining open part of the central box, which is equipped with fold-away legs for the purpose of converting it into a table; extendable means for attaching said rig to the rear of said van and for supporting one end of said rig when unfolded for use; a pair of legs for supporting the free end of said rig when it is unfolded; and a tent of canvas or similar material which is attachable to the perimeter of the unfolded and erected rig, and to the rear of the van to which said rig is attached, and said tent being provided with flaps which cover the unfolded rig to form a roof for said tent, said tent being also divided into two equal but opposite sections for storing each section into each of said hinged wings.

2. A camping rig such as described in claim 1, in which said extendable means for the attachment of the rig to the rear of the van, consists of a pair of slotted metal bars for supporting and holding the rig between them, one end of each bar being attachable to said van, and said bars being foldable into half their length by being hinged at their centers, for carrying the folded rig, and opened to their full length when said rig is unfolded for use, said slots containing therein a pair of wing nut equipped bolts which slide freely within them; each bolt being rigidly attached to said central box, on opposite sides thereof.

* * * * *